(12) United States Patent
Panic

(10) Patent No.: US 7,477,969 B2
(45) Date of Patent: Jan. 13, 2009

(54) TEMPERATURE CONDITIONED ASSEMBLY HAVING A CONTROLLER IN COMMUNICATION WITH A TEMPERATURE SENSOR

(75) Inventor: Zoran Panic, Windsor (CA)

(73) Assignee: W.E.T. Automotive Systems AG, Odelzhausen (DE)

( * ) Notice: Subject to any disclaimer, the term of this patent is extended or adjusted under 35 U.S.C. 154(b) by 198 days.

(21) Appl. No.: 10/947,860

(22) Filed: Sep. 23, 2004

(65) Prior Publication Data

US 2005/0085968 A1    Apr. 21, 2005

Related U.S. Application Data

(60) Provisional application No. 60/508,036, filed on Oct. 2, 2003.

(51) Int. Cl.
*B60N 2/56* (2006.01)
*A47C 7/74* (2006.01)
(52) U.S. Cl. ............... 701/36; 297/180.1; 219/217
(58) Field of Classification Search ............ 701/1, 701/36; 219/217
See application file for complete search history.

(56) References Cited

U.S. PATENT DOCUMENTS

| | | | | |
|---|---|---|---|---|
| 3,017,493 | A * | 1/1962 | Cooke | 219/537 |
| 3,127,931 | A * | 4/1964 | Johnson | 165/43 |
| 3,743,182 | A * | 7/1973 | Harmon et al. | 236/78 R |
| 4,044,221 | A * | 8/1977 | Kuhn | 219/217 |
| 4,258,706 | A * | 3/1981 | Shank | 601/55 |
| 4,304,314 | A * | 12/1981 | Sakaguchi et al. | 180/68.2 |
| 4,306,218 | A * | 12/1981 | Leconte et al. | 340/468 |
| 4,316,251 | A | 2/1982 | Saito et al. | |
| 4,408,278 | A | 10/1983 | Saito et al. | |
| 4,411,385 | A | 10/1983 | Lamkewitz | |
| 4,590,359 | A * | 5/1986 | Mobius | 219/217 |
| 4,633,061 | A * | 12/1986 | Arikawa | 219/202 |
| 4,736,091 | A * | 4/1988 | Moe | 219/505 |
| 4,821,354 | A * | 4/1989 | Little | 5/422 |
| 4,825,048 | A * | 4/1989 | Altmann et al. | 219/528 |
| 4,848,444 | A | 7/1989 | Heinle et al. | |

(Continued)

FOREIGN PATENT DOCUMENTS

DE    4141224    6/1993

(Continued)

OTHER PUBLICATIONS

Automotive Heated Seats-Heated Steering Wheels; IGB Automotive Ltd., 3090 Marentette Ave., Windsor, ON N8X 4G2, published prior to Jan. 10, 2003.

(Continued)

*Primary Examiner*—Jack W. Keith
*Assistant Examiner*—Ari M Diacou
(74) *Attorney, Agent, or Firm*—Dobrusin & Thennisch PC

(57) ABSTRACT

There is disclosed a temperature conditioned assembly for use in a component (e.g., a seat or steering wheel) of a transportation vehicle (e.g., an automotive vehicle, a plane, a train or the like). The assembly typically includes one or more conditions such as a heater and/or a ventilation or cooling system. A controller and a temperature sensor are also included in the assembly. Preferably, the controller is programmed to effect an energy output sequence that is based upon the ambient temperature sensed by the temperature sensor.

19 Claims, 2 Drawing Sheets

U.S. PATENT DOCUMENTS

| | | | |
|---|---|---|---|
| 4,869,550 A * | 9/1989 | Lorenzen et al. | 297/180.12 |
| 4,952,776 A * | 8/1990 | Huguet | 219/217 |
| 4,966,145 A * | 10/1990 | Kikumoto et al. | 607/104 |
| 5,002,335 A * | 3/1991 | Bengtsson | 297/180.12 |
| D316,942 S * | 5/1991 | Johnson | D6/611 |
| 5,285,963 A | 2/1994 | Wakefield et al. | |
| 5,288,974 A * | 2/1994 | Hanzic | 219/501 |
| 5,319,929 A * | 6/1994 | Cornelison et al. | 60/274 |
| 5,422,461 A * | 6/1995 | Weiss et al. | 219/501 |
| 5,440,486 A * | 8/1995 | Rudzewicz et al. | 701/36 |
| 5,524,439 A * | 6/1996 | Gallup et al. | 62/3.5 |
| 5,626,021 A * | 5/1997 | Karunasiri et al. | 62/3.5 |
| 5,894,207 A * | 4/1999 | Goings | 318/478 |
| 5,921,100 A * | 7/1999 | Yoshinori et al. | 62/244 |
| 5,921,314 A * | 7/1999 | Schuller et al. | 165/43 |
| 5,924,766 A * | 7/1999 | Esaki et al. | 297/180.13 |
| 5,948,297 A * | 9/1999 | Haubner et al. | 219/202 |
| 5,981,918 A * | 11/1999 | Topp et al. | 219/499 |
| 6,059,018 A * | 5/2000 | Yoshinori et al. | 165/42 |
| 6,070,115 A | 5/2000 | Oestreicher et al. | |
| 6,079,485 A * | 6/2000 | Esaki et al. | 165/43 |
| 6,104,972 A * | 8/2000 | Miyamoto et al. | 701/45 |
| 6,105,667 A * | 8/2000 | Yoshinori et al. | 165/202 |
| 6,118,099 A | 9/2000 | Lake et al. | |
| 6,179,378 B1 * | 1/2001 | Baumgartner et al. | 297/180.12 |
| 6,179,706 B1 * | 1/2001 | Yoshinori et al. | 454/120 |
| 6,186,592 B1 * | 2/2001 | Orizaris et al. | 297/180.12 |
| 6,189,520 B1 | 2/2001 | Cook et al. | |
| 6,194,687 B1 * | 2/2001 | Joseph et al. | 219/217 |
| 6,252,208 B1 | 6/2001 | Topp | |
| 6,254,179 B1 * | 7/2001 | Kortum et al. | 297/180.12 |
| 6,273,810 B1 * | 8/2001 | Rhodes et al. | 454/120 |
| 6,291,803 B1 * | 9/2001 | Fourrey | 219/497 |
| 6,445,988 B1 | 9/2002 | Breed et al. | |
| 6,454,178 B1 | 9/2002 | Fusco et al. | |
| 6,480,103 B1 | 11/2002 | McCarthy et al. | |
| 6,541,737 B1 * | 4/2003 | Eksin et al. | 219/217 |
| 6,552,442 B2 * | 4/2003 | Liao et al. | 307/9.1 |
| RE38,128 E * | 6/2003 | Gallup et al. | 62/3.5 |
| 6,590,354 B2 | 7/2003 | Hein | |
| 6,676,207 B2 * | 1/2004 | Rauh et al. | 297/180.14 |
| 6,727,467 B1 | 4/2004 | Hadzizukic et al. | |
| 6,914,217 B2 * | 7/2005 | Fristedt | 219/217 |
| 2001/0004008 A1 * | 6/2001 | Aoki et al. | 165/43 |
| 2001/0022222 A1 * | 9/2001 | Aoki et al. | 165/203 |
| 2001/0029162 A1 * | 10/2001 | Yoshinori et al. | 454/137 |
| 2002/0105213 A1 * | 8/2002 | Rauh et al. | 297/180.14 |
| 2003/0024924 A1 | 2/2003 | Fristedt | |
| 2004/0036326 A1 | 2/2004 | Bajic et al. | |
| 2005/0040682 A1 * | 2/2005 | Ulbrich | 297/180.12 |
| 2005/0066505 A1 * | 3/2005 | Iqbal et al. | 29/428 |
| 2005/0067862 A1 * | 3/2005 | Iqbal et al. | 297/180.11 |
| 2006/0267383 A1 * | 11/2006 | Bargheer et al. | 297/180.14 |

FOREIGN PATENT DOCUMENTS

| | | |
|---|---|---|
| DE | 19844514 | 1/2000 |
| EP | 0 364 649 A1 | 4/1990 |
| EP | 1 060 943 | 12/2000 |
| EP | 1 345 104 | 9/2003 |
| WO | WO95/14899 | 6/1995 |
| WO | WO96/05475 | 2/1996 |
| WO | WO96/25301 | 8/1996 |
| WO | WO99/32309 | 7/1999 |
| WO | WO02/006914 | 1/2002 |
| WO | WO03/101777 | 12/2003 |
| WO | WO2004/114513 | 12/2004 |

OTHER PUBLICATIONS

International Search Report and Written Opinion dated Apr. 21, 2006. PCT/IB05/004071 (1139.016WO).

* cited by examiner

US 7,477,969 B2

TEMPERATURE CONDITIONED ASSEMBLY HAVING A CONTROLLER IN COMMUNICATION WITH A TEMPERATURE SENSOR

CLAIM OF BENEFIT OF FILING DATE

The present application claims the benefit of the filing date of U.S. Provisional Application Ser. No. 60/508,036, filed Oct. 2, 2003, hereby incorporated by reference.

FIELD OF THE INVENTION

The present invention relates to a temperature conditioned assembly and more particularly to a temperature conditioned assembly having a controller in communication with a temperature sensor.

BACKGROUND OF THE INVENTION

For many years, industry has been concerned with designing temperature conditioned (e.g., heated, ventilated and/or cooled) seat and steering wheel assemblies for transportation vehicles or other articles of manufacture. Some of these assemblies employ one or more temperature sensors adjacent to heaters of these assemblies for assisting in controlling the heat output of those heaters. Use of such sensors can be quite expensive due to costs of the sensors, costs for protecting the sensors, costs for wire or other connections to the sensors and costs of assembly required for the sensors. Thus, the present invention seeks to provide a temperature conditioned seat assembly that includes a sensor for assisting in controlling heat output of a heater and/or air output, heat removal or both of a ventilator or cooler while maintaining a relatively low cost for adding the sensor to the overall assembly.

SUMMARY OF THE INVENTION

An assembly for a transportation vehicle is disclosed. The assembly includes a component such as a seat or steering wheel located within a passenger compartment of the transportation vehicle. A conditioner is configured for providing at least one of heating, cooling or ventilation to the component of the transportation vehicle. A controller is in communication with the conditioner and an energy source and the controller includes a temperature sensor integrated therewith. The controller is located within the compartment of the transportation vehicle non-adjacent to the conditioner such that the temperature sensor can measure a temperature of ambient air within the compartment of the transportation vehicle. Additionally, the controller includes programming for, upon activation of the conditioner, effecting a particular energy output sequence from the energy source to the conditioner based upon the temperature of the ambient air at the time of activation.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing a temperature conditioned assembly for use with a component (e.g. a seat or steering wheel) of a transportation vehicle (e.g., an automotive vehicle, a plane, a train or the like). The assembly typically includes a component such as a steering wheel or a seat having a vehicle seat cushion component such as a backrest cushion component, a base cushion component or both. The assembly also typically includes a heater and/or a ventilation or cooling system. A controller and a temperature sensor are also included in the assembly and the controller is preferably integrated with the temperature sensor, although not necessarily required. In a preferred embodiment, the temperature sensor is configured for sensing an ambient air temperature within a compartment of the transportation vehicle (e.g., within the cabin or passenger compartment of an automotive vehicle). Also, in the preferred embodiment, the controller is programmed to effect an energy output sequence that is based upon the ambient air temperature sensed by the temperature sensor.

Figure 1:
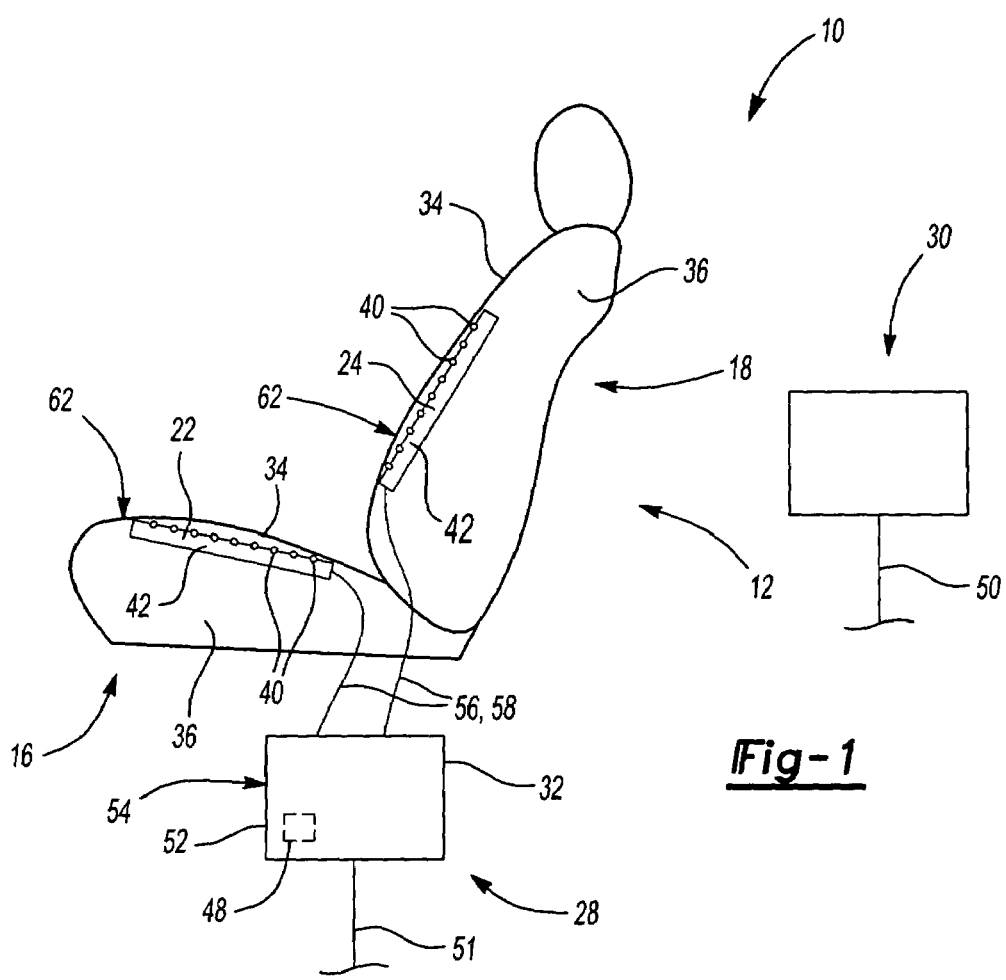
FIG. 1 is a schematic view of an exemplary heated seat assembly according to an aspect of the present invention.

Referring to FIG. 1, there is illustrated one exemplary temperature conditioned (e.g., heated) seat assembly 10 in accordance with the present invention. The assembly 10 includes a seat 12 having a pair of seat cushion components 16, 18, which are shown as a base cushion component 16 and a seat backrest component 18. The seat assembly 10 also includes a first temperature conditioner 22 (e.g., a heater) and a second temperature conditioner 24 (e.g., a heater) that are in communication with a controller 28. Each of the conditioners 22, 24 and the controller 28 are preferably in communication with an energy source 30.

The seat cushion components 16, 18 may be provided as nearly any typical or conventional cushion or cushioning system employed in a transportation vehicle. Preferably, the seat cushion components 16, 18 include foam cushions or other supportive and cushioning members. The seat cushion components 16, 18 may also include trim (e.g., leather) coverings or the like.

In FIG. 1, each of the conditioners 22, 24 are shown as heaters that are substantially identical to each other with the exception that one overlays at least a portion (e.g. a cushion) of the base cushion component 16 and one overlays at least a portion (e.g., a cushion) of the seat backrest component 18. The conditioners 22, 24 are both generally flat or planar type heaters that are disposed between a trim layer 34 and a cushion 36 of the seat 12. Preferably, the heaters include one or more temperature changers shown as heating elements 40, which are at least partially supported by a substrate 42. As examples of such planar heaters, the heating elements may be wire conductors, printed conductive mediums or the like, which may be attached to the substrate by sewing, adhesion, fasteners or the like.

In alternative embodiments, it is contemplated that various different types of heaters may be employed as conditioners in the seat assembly of the present invention. As examples, positive thermal coefficient (PTC) heaters, carbon fiber (e.g., carbon lay-wire heaters), conductive rubber heaters, paint/ink heaters combinations thereof or the like may be employed in the seat assembly. Additionally or alternatively, it is contemplated that the seat assembly may employ a ventilation system, a cooler or an integrated heater/cooler or heater/ventilator as one or more conditioners of the present invention.

As an example of a heater/cooler system, a thermoelectric air conditioner system may be employed to condition (i.e., heat or cool) air, and that air may be blown toward a seating surface or trim layer of a seat of an automotive vehicle with a blower or otherwise. Such a heater/cooler system is disclosed in U.S. Pat. RE38,128 E, which is expressly incorporated by reference herein for all purposes. As an example of a heater/ventilator system, an insert having a planar type heater and a blower in fluid communication with a seating surface may be employed to heat the seating surface and move air through the seat surface. Such a heater/ventilator system is disclosed in U.S. patent application Ser. No. 10/434,890, filed May 9, 2003, which is expressly incorporated by reference herein for all purposes.

It should generally be understood that any of the conditioners discussed herein may be employed alone or in combination with any other of the conditioners discussed herein. Additionally, it should be understood that any one, two or more of the conditioners may be employed for conditioning (e.g., heating or cooling) a surface or trim layer of either the backrest component or the base component.

While the particular heaters illustrated in FIG. 1 are vehicle seat heaters, it is contemplated that the controller and temperature sensor described herein may be employed in conjunction with other heaters as well. In particular, the controller and temperature sensor can be advantageously employed in conjunction with a steering wheel heater such as the steering wheel heater described in U.S. Pat. No. 6,727,467, which is incorporated herein by reference for all purposes. As such, it should be recognized that the controller and temperature sensor may be configured the same and may operate in the same manner for a steering wheel heater or another automotive vehicle heater as described herein for the illustrated heaters.

The controller 28 in the assembly 10 is shown as a block since it will be understood that the controller 28 may be provided in a variety of configurations. As shown, the controller 28 is integrated with a temperature sensor 48 (e.g., an $N_{tc}$ or other type of temperature sensor). However, it is contemplated that the controller 28, the temperature sensor 48 or both may be placed at any location within the vehicle as long as the temperature sensor is in communication with the controller via busses, wires, communication waves (e.g., radio waves) or otherwise.

Typically, controller 28, the temperature sensor 48 or both are located within the cabin of the vehicle non-adjacent to any of the one or more conditioners and more particularly, non-adjacent to any temperature changer such as a heating, cooling or ventilating output portion (e.g., a heating element, an induced airflow or the like) of the one or more conditioners. As used herein, the term non-adjacent as it refers to the temperature sensor, the controller, the conditioner, the temperature changers or the like is intended to mean at least 4 cm away, but more preferably means at least 8 cm, and even more preferably means at least 15 cm away. Of course, unless stated otherwise, the temperature sensor, the controller or both may be closer to such a heating, cooling or ventilating output portion and may even be directly adjacent thereto. It is also contemplated that the control module with the sensor integrated therein may be attached to the heater (e.g., the substrate or heating elements). It further contemplated that the temperature sensor may be integrated with various components in or adjacent the vehicle cabin and the temperature sensor may be in communication with other components (e.g., a digital temperature readout) other than the controller.

The temperature sensor 48 may be located within the controller 28 (e.g., within a housing 52 of the controller 28).

Alternatively, the temperature sensor 48 may be attached to an outer surface of the controller 28 (e.g., upon an outer surface 54 of the housing 52 of the controller 28). In a highly preferred embodiment, the controller 28 includes one or more circuit boards and the temperature sensor 48 is printed upon, soldered upon or otherwise attached to the one or more circuit boards (e.g, as a resistance sensor, an $N_{tc}$ sensor or the like)).

The energy source 30 of the assembly 10 is preferably a battery of the automotive vehicle, although not required. The energy source 30 is typically in electrical communication with the one or more conditioners and at least in signaling communication with the controller 28. In the preferred embodiment illustrated, the energy source 30 is in electrical communication with the controller 28 via one or more electrical busses 50, 51 and the conditioners 22, 24 are in electrical communication with the controller 28 and the energy source via one or more electrical busses 56, 58.

In operation, the one or more conditioners may be activated to provide heating, cooling, ventilation or a combination thereof. As used herein, the term "activate" as it refers to activating or activation of the conditioner includes any inducement of the conditioner to provide heating, cooling, ventilation or a combination thereof and it includes any action that raises or lowers the amount of heating, cooling, ventilation or a combination thereof provided by the conditioner. Thus, the term "activate" can refer to turning the conditioner on and can also include changing the energy level supplied to the conditioner.

Upon activation, the temperature sensor 48 provides a signal to the controller 28 informing the controller 28 of the temperature at the sensor 48. This temperature may be sensed at any location within the vehicle. Preferably, the temperature is sensed within the cabin of the vehicle non-adjacent to any of the one or more conditioners and more particularly, non-adjacent to any temperature changers such as heating, cooling or ventilating output portions (e.g., a heating element, an induced airflow or the like) of the one or more conditioners. Of course, unless stated otherwise, the temperature sensed may be closer to such temperature changers and may even be directly adjacent thereto or contacting such changers.

In the embodiment illustrated, the temperature sensor 48 is integrated with the controller 28 such that the temperature sensor 48 signals the controller 28 with a signal at least partially indicative of the temperature of the air about the controller 28. In FIG. 1, the controller 28 and sensor 48 are located behind the seat cushion component 16 of the seat 12 and the signal is preferably indicative of the temperature of the ambient air in the cabin of the vehicle. However, that location may be any of the locations discussed herein.

Upon receiving the signal from the temperature sensor 48, the controller 28 is programmed to allow the energy source 30 to provide a particular energy output sequence to the one or more conditioners. Preferably, the particular energy output sequence is based upon the temperature sensed by the temperature sensor.

As used herein, energy output sequence can include one energy level output for a particular amount of time or any sequence of energy output levels for same or different amounts of time. The particular energy output sequence can include any energy sequence from the energy source 30 to the one or more conditioners. For example, the energy sequence may include gradually applying greater and greater amounts of energy to the conditioners until a maximum amount of energy output is reached. Alternatively, the energy source may provide a maximum energy output to the one or more conditioners followed by tapering off the amount of energy provided.

In one embodiment, the controller allows the energy source to provide a first or higher (e.g., maximum) amount of energy to the one or more conditioners followed by providing a second or lower (e.g., operational) amount of energy to the one or more conditioners. Preferably, the first or higher amount of energy is provided for an initial amount of time based upon the temperature signaled by the temperature sensor.

Thus, when the conditioner is a heater, the intial amount of time may be longer when the temperature sensed is relatively low while the initial amount of time may be shorter when the temperature sensed is relatively high. Conversely, when the conditioner is a cooler or ventilator, the initial amount of time may be longer when the temperature sensed is relatively high while the intial amount of time may be shorter when the temperature sensed is relatively low.

Preferably, the intial amount of time is determined with reference to one or more algorithms or mathematical functions, which are programmed into the controller. Advantageously, such mathematical functions may be developed by performing experiments upon a seat assembly and developing empirical data for the particular seat assembly.

Figure 2:
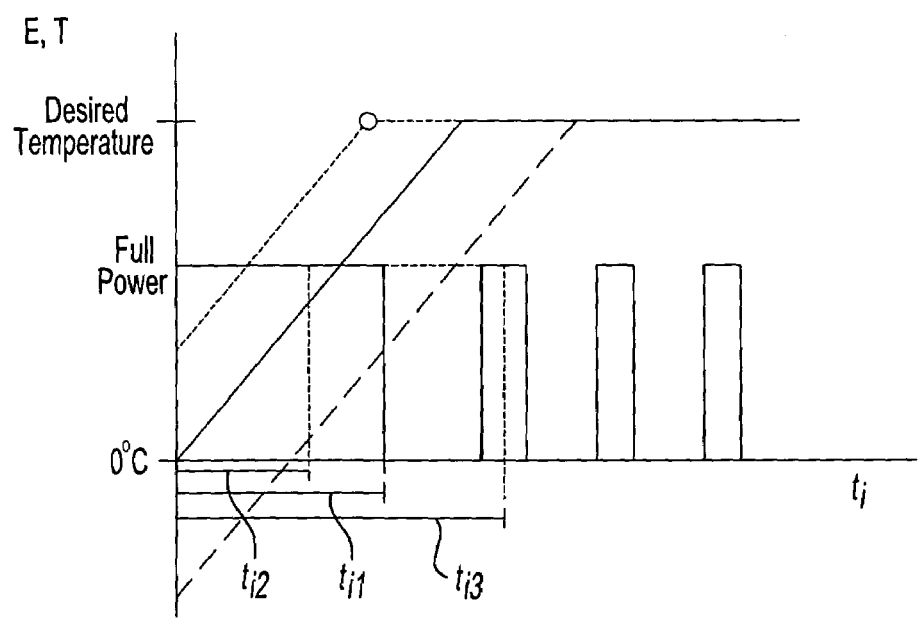
FIG. 2 is a graph illustrating an exemplary mode of operation for a seat assembly of the present invention.

For the assembly 10 of FIG. 1, and additionally referring to the graph of FIG. 2, experiments are performed for the heaters 22, 24 of the assembly 10. Preferably, the experiments determine the amount of time ($t_i$) for which the energy source 30 needs to provide maximum energy to the heaters 22, 24 to reach a desired temperature ($T_d$) at a surface 62 of the seat 12 for a typical passenger (e.g., a 160 pound person) depending upon the temperature sensed ($T_s$) by the temperature sensor 48 (i.e., the ambient temperature surrounding the seat 12). Thereafter, the amounts of time ($t_i$) are correlated to the desired temperature ($T_d$) and the temperature sensed ($T_s$) via a mathematical function (e.g., ($t_i$)=f($T_d$, $T_s$)) and the mathematical function is programmed into the controller 28.

Thus, upon activation of one or both of the seat heaters 22, 24, the temperature sensed ($T_s$) by the temperature sensor 48 is signaled to the controller 28. Based on the temperature sensed ($T_s$), the controller 28 calculates an amount of time ($t_i$) to provide heat up or maximum energy to the heaters 22, 24 to reach the desired temperature ($T_d$) and allows the energy source 30 to provide such energy for the calculated time. As can be seen by the graph of FIG. 2, the amount of initial time calculated ($t_i$) is typically lower (e.g., ($t_{i2}$)) than average (e.g., ($t_{i1}$)) for higher sensed temperatures and higher (e.g., ($t_{i3}$)) than average (e.g., ($t_{i1}$)) for lower sensed temperatures.

After initial heat-up or provision of energy, the controller 28 will allow or command the energy source to provide a second or operational amount of energy to the heaters 22, 24, which is preferably lower than the heat up or maximum amount of energy. Of course, it is contemplated that energy outputs may be varied or continued after activation of the heaters and such variance or continuance may be based upon further reading from the temperature sensor.

In one embodiment, after initial heat-up, the controller is programmed to provide energy at different levels to the heaters or to a ventilator with the different energy levels being selected based upon temperatures sensed at multiple consecutive predetermined time periods. For example, for FIGS. 1 and 2, the controller 28 may be programmed to adjust the amount of energy (i.e., provide a different duty cycle or percentage of maximum energy) to the heaters 22, 24 depending upon the temperature sensed after the passage of each of several predetermined time periods (e.g., after the passage of every 10 seconds). Of course, the amount of energy provided may remain the same for two or more consecutive time periods, particularly where the temperature sensed at the beginning of the two or more time periods does not show a significant amount of change.

It should be recognized that a controller and temperature sensor may function for a cooler or ventilator in a manner similar to that described for the heaters. In particular, a controller may be programmed to operate a cooler or ventilator at one output level for an initial amount of time followed by operating the cooler or ventilator at a second, preferably lower, output level thereafter. Moreover, as with the heaters, the initial amount of time may be determined by a mathematical function determined from empirical data based upon experimentation.

According to one additional or alternative embodiment, the controller may be programmed with a shut down feature whereby the controller commands the heater, the ventilator or both to shut down after a predetermined amount of continuous operation. For example, the controller can be programmed to shut down or stop providing energy to the heater if the power supply has been providing or cycling energy continuously to the heater or ventilator for a period of time greater than about 10 minutes, more typically greater than about 20 minutes and even more typically about 30 minutes.

Figure 3:
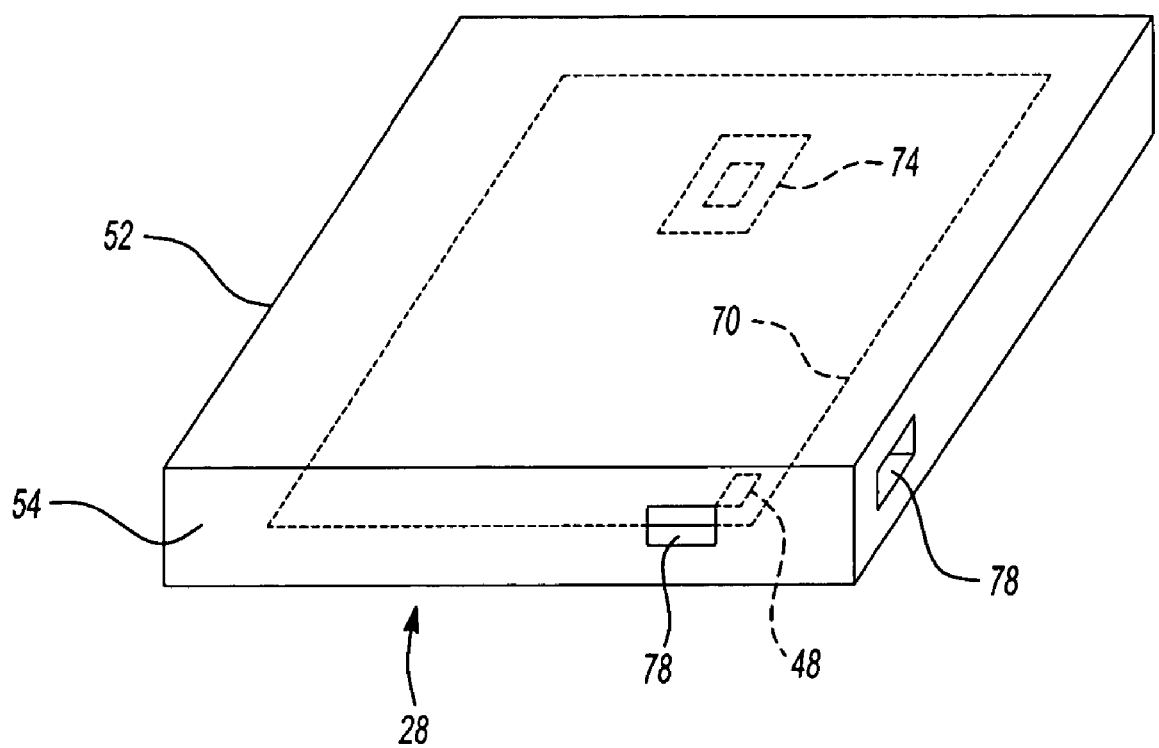
FIG. 3 is a perspective view of a controller in accordance with an aspect of the present invention.

Typically, at least a portion of the temperature sensor is located adjacent an outer periphery or housing controller (i.e., within 2 cm, more typically within 1.2 cm and even more typically within 0.7 cm), although not required. As shown in FIG. 3, the temperature sensor 48 is printed or located upon a circuit board 70 such that the sensor 48 is within 0.7 cm of the housing 52. Advantageously, such an arrangement typically allows the sensor to more accurately sense the ambient temperature.

It is also typical for substantially the entire temperature sensor to be located away from the entirety of any main circuit (e.g., a solid state switch or transistor) on the controller (i.e., more than 1.5 cm, more typically more than 2.0 cm and even more typically more than 2.5 cm away), although not required. As shown in FIG. 3, no portion of the temperature sensor 48 is located closer than 2.0 cm from a main transistor 74, which controls the on/off function of the controller 28, the heaters 22, 24 or a combination thereof. Advantageously, such an arrangement typically allows the sensor to more accurately sense the ambient temperature.

It is also contemplated that one or more openings may be located in the housing of the controller to allow fluid communication between the environment surrounding the temperature sensor and the ambient environment or environment surrounding the controller housing. As shown in FIG. 3, the housing 52 includes a plurality of such openings 78 (e.g., through-holes) adjacent to at least a portion of the temperature sensor 48 (i.e., within 2 cm, more typically within 1.2 cm and even more typically within 0.7 cm). Advantageously, such an arrangement typically allows the sensor to more accurately sense the ambient temperature.

Regardless of the location of the temperature sensor or the openings in the housing, it is contemplated that tests or experiments may be performed upon the temperature sensor, the controller or both to determine how closely the temperature sensor readings come to the actual ambient temperature within a vehicle and empirical data can be developed based upon the experiments. Thereafter, it is possible to program the controller to accounts for any variances between the sensor readings and the actual ambient temperature using the empirical data. Thus, it should be understood that measurements of ambient temperatures as discussed herein also include measurements designed to closely approximate ambient temperatures.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An assembly for a transportation vehicle, comprising:
   a component located within a passenger compartment of the transportation vehicle;
   a conditioner configured for providing at least one of heating, cooling or ventilation, and integrated with, embedded in, or conductively attached to the component of the transportation vehicle, selected from a seat or a steering wheel;
   a controller in communication with the conditioner and an energy source, the controller including a temperature sensor integrally located within the controller for directly controlling the conditioner, wherein:
   i) the controller and integral temperature sensor is located within the compartment of the transportation vehicle non-adjacent to any temperature changers or output portions of the conditioner such that the temperature sensor can measure a temperature of ambient air within the compartment of the transportation vehicle; and
   ii) the controller includes programming for, upon activation of the conditioner, effecting an energy output sequence from the energy source to the conditioner based upon only the temperature of the ambient air at the time of activation.

2. An assembly as in claim 1 wherein the periphery of the controller is defined at least partially by a housing.

3. An assembly as in claim 2 wherein the housing includes an opening to provide fluid communication between the ambient air and the air surrounding the temperature sensor, wherein the opening is located a distance of 2 cm to 0.7 cm of the temperature sensor.

4. An assembly as in claim 3 wherein the energy output sequence includes providing a predetermined amount of energy to the conditioner for an initial predetermined amount of time that is based upon the temperature of the ambient air.

5. An assembly as in claim 4 wherein the energy output sequence includes, after the initial amount of time, providing energy to the conditioner at various levels depending upon the temperature of the ambient air sensed at intervals of time.

6. An assembly for an automotive vehicle, comprising:
   a component located within a passenger compartment of the automotive vehicle wherein the component is selected from a seat or a steering wheel;
   a heater integrated with, embedded in, or conductively attached to the component;
   a controller in communication with the heater and an energy source, the controller including a temperature sensor integrally located within the controller, wherein:
   i) the controller is also located within the compartment of the automotive vehicle such that the temperature sensor is non-adjacent to heater or any output portion of the heater such that the temperature sensor can measure a temperature of ambient air within the compartment of the automotive vehicle;
   ii) the controller includes programming, which, upon activation of the heater, effects an energy output sequence from the energy source to the heater based upon only the temperature of the ambient air at the time of activation; and
   iii) the temperature sensor is printed upon or soldered to a circuit board of the controller.

7. An assembly as in claim 6 wherein the periphery of the controller is defined at least partially by a housing.

8. An assembly as in claim 7 wherein the housing includes an opening to provide fluid communication between the ambient air and the air surrounding the temperature sensor.

9. An assembly as in claim 6 wherein the energy output sequence includes providing a predetermined amount of energy to the heater for an initial predetermined amount of time that is based upon the temperature of the ambient air.

10. An assembly as in claim 9 wherein the energy output sequence includes, after the initial amount of time, providing energy to the heater at various levels depending upon the temperature of the ambient air sensed at intervals of time.

11. A seat assembly for an automotive vehicle, comprising:
    a seat cushion component having a seating surface, the seat cushion component selected from a backrest cushion component or a base cushion component;
    a heater with at least one heating element configured for providing heat to or adjacent the seating surface of the seat cushion component wherein the heater is generally flat and overlays a cushion of the seat cushion component and is disposed between a trim layer and the cushion;
    a controller, in communication with the heater and an energy source, the controller including a temperature sensor for directly controlling the heater wherein:
    i) the controller is located within a cabin of the automotive vehicle such that the temperature sensor is non-adjacent to the heater, to any temperature changers or output portions of the heater, such that the temperature sensor can measure a temperature of ambient air within the cabin of the automotive vehicle; and
    ii) the controller includes programming for, upon activation of the heater, effecting a particular energy output sequence from the energy source to the heater based upon only the temperature of the ambient air at the time of activation.

12. An assembly as in claim 11 wherein the heater overlays a cushion of the seat cushion component, the heater including a substrate and at least one heating element.

13. An assembly as in claim 11 wherein the temperature sensor is located within 2.0 cm of a periphery of the controller.

14. An assembly as in claim 13 wherein the periphery of the controller is defined at least partially by a housing.

15. An assembly as in claim 14 wherein the housing includes an opening to provide fluid communication between the ambient air and the air surrounding the temperature sensor.

16. An assembly as in claim 11 wherein the energy output sequence includes providing a predetermined amount of energy to the heater for an initial predetermined amount of time that is based upon the temperature of the ambient air.

17. An assembly as in claim 16 wherein the energy output sequence includes, after the initial amount of time, providing energy to the heater at various levels depending upon the temperature of the ambient air sensed at intervals of time.

18. An assembly as in claim 1 wherein the temperature sensor is at least 15 cm away from the conditioner.

19. An assembly as in claim 6 wherein the temperature sensor is at least 15 cm away from the heater.

* * * * *